US008848648B2

(12) United States Patent
Wang

(10) Patent No.: US 8,848,648 B2
(45) Date of Patent: Sep. 30, 2014

(54) METHOD AND DEVICE FOR UPDATING TRACKING AREA IDENTITY LIST

(75) Inventor: Hucheng Wang, Beijing (CN)

(73) Assignee: China Academy of Telecommunications Technology, Beijing (CN)

(*) Notice: Subject to any disclaimer, the term of this patent is extended or adjusted under 35 U.S.C. 154(b) by 113 days.

(21) Appl. No.: 13/700,989

(22) PCT Filed: Aug. 4, 2011

(86) PCT No.: PCT/CN2011/077990
§ 371 (c)(1),
(2), (4) Date: Nov. 29, 2012

(87) PCT Pub. No.: WO2012/016530
PCT Pub. Date: Feb. 9, 2012

(65) Prior Publication Data
US 2013/0077592 A1 Mar. 28, 2013

(30) Foreign Application Priority Data
Aug. 4, 2010 (CN) .......................... 2010 1 0245348

(51) Int. Cl.
*H04W 4/00* (2009.01)
*H04W 8/02* (2009.01)
*H04W 76/04* (2009.01)
*H04W 60/04* (2009.01)

(52) U.S. Cl.
CPC .............. *H04W 8/02* (2013.01); *H04W 60/04* (2013.01); *H04W 76/048* (2013.01)
USPC ............................ 370/329; 370/328; 370/331

(58) Field of Classification Search
None
See application file for complete search history.

(56) References Cited

U.S. PATENT DOCUMENTS

2013/0294413 A1* 11/2013 Kim et al. ..................... 370/331

FOREIGN PATENT DOCUMENTS

| CN | 101291531 | 10/2008 |
| CN | 101400099 | 4/2009 |
| CN | 101448328 | 6/2009 |
| CN | 101754373 | 6/2010 |

OTHER PUBLICATIONS

EPC Node failure; 3GPP TSG CT4 Meeting #49; C4-101116; Kyoto, Japan, May 10-14, 2010.

(Continued)

*Primary Examiner* — John Blanton
*Assistant Examiner* — Diane Lo
(74) *Attorney, Agent, or Firm* — Gilberto M. Villacorta

(57) ABSTRACT

The present application discloses a method and device for updating a tracking area list, which method comprises: determining, by a mobility management entity, whether a tracking area list allocated to a user device has been changed; determining, when the tracking area is changed, whether there is no tunnel management message on an S11 interface; and when there is no tunnel management message, sending, by the mobility management entity, a message to a serving gateway, with the message carrying a changed tracking area list or indication information capable of determining the changed tracking area list. The mobility management entity transfers a tracking area list to the serving gateway only when the tracking area list of the user device changes and can still transfer a new tracking area list to the serving gateway even when there is no tunnel management message on the S11 interface, thereby remedying the defects in the solutions in the prior art.

10 Claims, 2 Drawing Sheets

(56) References Cited

OTHER PUBLICATIONS

Introduction of the DLDTA (Down Link Data Triggered Attach) function; 3GPP TSG CT4 Meeting #49bis; C4-101741; Dublin, Ireland, Jun. 29-Jul. 2, 2010.

MME Failure: Handling the ECM-IDLE mode UE; 3GPP TSG CT4 Meeting #49bis; C-101767; Dublin, Ireland; Jun. 29-Jul. 2, 2010.

International Search Report for PCT/CN2011/077990—mailed Nov. 10, 2011.

* cited by examiner

METHOD AND DEVICE FOR UPDATING TRACKING AREA IDENTITY LIST

The present application is a US National Stage of International Application No. PCT/CN2011/077990, filed 4 Aug. 2011, designating, the United States, and claiming the benefit of Chinese Patent Application No. 201010245348.9, filed with the Chinese Patent Office on Aug. 4, 2010 and entitled "Method and device for updating tracking area list", which is hereby incorporated by reference in its entirety.

FIELD OF THE INVENTION

The present invention relates to the field of mobile communications and particularly to a method and device for updating a tracking area identity list.

BACKGROUND OF THE INVENTION

In the prior art, after a Mobility Management Entity (MME) is restarted, a User Equipment (UE) in an idle mode cannot detect the loss of established Packet Data Network (PDN) connection(s) until it initiates any TAU or Service Request procedure, by that TAU or Service Request procedure, the UE will be triggered to reattach onto the network. If the UE had any network service, e.g., an IP multimedia system voice call, before the UE reattaches to the network, then this downlink service would be rejected because there is no context of the UE on the MME.

In order to address the problem arising from the MME restart, two solutions have been proposed respectively as follows:

First Solution:

When the MME receives a TAU/Routing Area Update (RAU) request of the UE, the MME checks a Tracking Area (TA) List and determines whether it needs to be updated, and if the list needs to be updated and the UE has at least one Downlink Data Triggered Attach (DLDTA) bearer (as assumed in this method, based on the operator's configuration, for some bearers on S5/S8 interface of the UE, as long as they have downlink data, paging has to be triggered to recover the PDN connection(s) and guarantee user experience, even if the MME is restarted), then the MME has to notify the Serving Gateway (SGW) to update the stored TAI list by a Modify Bearer Request message (C4_101741: When MME receives the TA update request/RA update request message from UE, then MME checks if the TA-list information needs to be updated or not. If the TA-list needs to be updated and the UE has at least one DLDTA bearer, then MME sends the Modify bearer request message (..., TA-list/RA)), so that the SGW maintains the updated TAI list. after the MME is restarted, the SGW knows that the MME is restarted according to echo mechanism or like that, and at this time, the SGW decides to reserve some of the hearers on an S5/S8 interface as configured by the operator, and when downlink data arrive over these hearers, the SGW triggers paging and also will carry the stored latest TAI list of the UE in the downlink data notification to the MME. The UE will reattach to the network upon reception of a paging message carrying an International Mobile Subscriber Identity (IMSI).

Second Solution:

In session establishment and modification procedures, the MME will notify the SGW of the latest updated TAI list (C4_101767: During the session establishment and modification procedures, the MME transfers the latest TAI list of the UE to the SGW), and after the MME is restarted, the SGW knows in an echo mechanism or like that the MME is restarted, and at this time, the SGW triggers paging and also carries all the TAI lists of UEs related to the MME in a downlink data notification to the MME, the MME pages all the UEs, and the UEs are reattached to the network and reestablish all the PDN connections upon reception of a paging message carrying an IMSI.

Drawbacks of the prior art at least lie in that:

The two solutions may not satisfy a demand for updating a TAI list; and

The two solutions may not necessarily enable a TAI list to be updated.

SUMMARY OF THE INVENTION

A technical problem to be addressed by the invention is to provide a method of and apparatus for updating a tracking area identity list so as to solve the problem in the prior art that a TAI list may not be updated in time.

There is provided in an embodiment of the invention a method for updating a TAI list, which includes the steps of:

determining, by an MME, whether a TAI list allocated to a UE is changed;

determining whether there is no Tunnel Management Message, TMM, message on an S11 interface when the TAI list is changed; and transmitting to an SGW a message carrying the changed TAI list or indication information from which the changed TAI list can be determined when there is no TMM message.

There is provided in an embodiment of the invention an MME apparatus including:

a list determining module configured to determine whether a TAI list allocated to a UE is changed;

a message determining module configured to determine whether there is no TMM message on an S11 interface when the TAI list is changed; and a transmitting module configured for the MME to transmit to an SGW a message carrying the changed TAI list or indication information from which the changed TAI list can be determined when there is no TMM message.

A method for updating a TAI list includes the steps of:

receiving, by an SGW, a message transmitted from an MME upon determining that a TAI list allocated to a UE is changed and that there is no TMM message on a current S11 interface, wherein the message carries the changed TAI list or indication information from which the changed TAI list can be determined; and storing, by the SGW, the changed TAI list or the indication information, from which the changed TAI list can be determined, carried in the message.

An SGW apparatus includes:

a receiving module configured to receive a message transmitted from an MME upon determining that a TAT list allocated to a UE is changed and that there is no TMM message on a current SI 1 interface, wherein the message carries the changed TAI list or indication information from which the changed TAI list can be determined; and a storing module configured to store the changed TAI list or the indication information, from which the changed TAI list can be determined, carried in the message.

Advantageous effects of the invention are as follows:

Since an MME transmits a message to an SGW only upon determining that a TAI list is changed, the MME can transmit the TAI list of a UE to the SGW only when the TAI list is changed, and furthermore since a message carrying the latest TAI list or indication information from which the changed TAI list can be determined even when there is no TMM message, the new TAI list can be transported to the SGW even if there is no TMM signaling message on an S11 interface at that time to thereby remedy the drawbacks of the solution in the prior art.

DETAILED DESCRIPTION OF THE EMBODIMENTS

The inventors have identified during making the invention that:

In the first solution in the Background of the Invention, the MME updates a TAI list only when the UE initiates the TAU/RAU request; and in the second solution, the TAI list is updated in the session establishment or modification procedure. However a change to the TAI list may not occur or will occur only in these procedures, for example, the UE initiates a periodical TAU procedure, but the TAI list of the UE at this time may not be changed, and it is not necessary to notify the SGW of the TAI list. Furthermore a change to the TAI list may also occur in a Globally Unique Temporary Identity (GUTI) Reallocation procedure, so the TAI list will not be updated only in the foregoing procedures.

In the two solutions, a TAI list has to be transported via an S11 interface between the MME and the SGW, but in some scenarios, a changed TAI list of some UE on the MME may not be transmitted via the S11 interface even if the TAI list is changed, for example, the UE moves out of the original TAI list resulting in an intra MME intra SGW TAU procedure, GUTI reallocation procedure, etc., and in these scenarios, the MME can not transport the changed TAI list to the SGW in time.

In view of this, a technical solution according to an embodiment of the invention addresses the problems of how an MME selects an appropriate occasion for transporting a TAI list to an SGW and how the MME updates a TAI list on the SGW if there is no signaling message on an S11 interface between the MME and the SGW. Particular embodiments of the invention will be described below with reference to the drawings.

Figure 1:
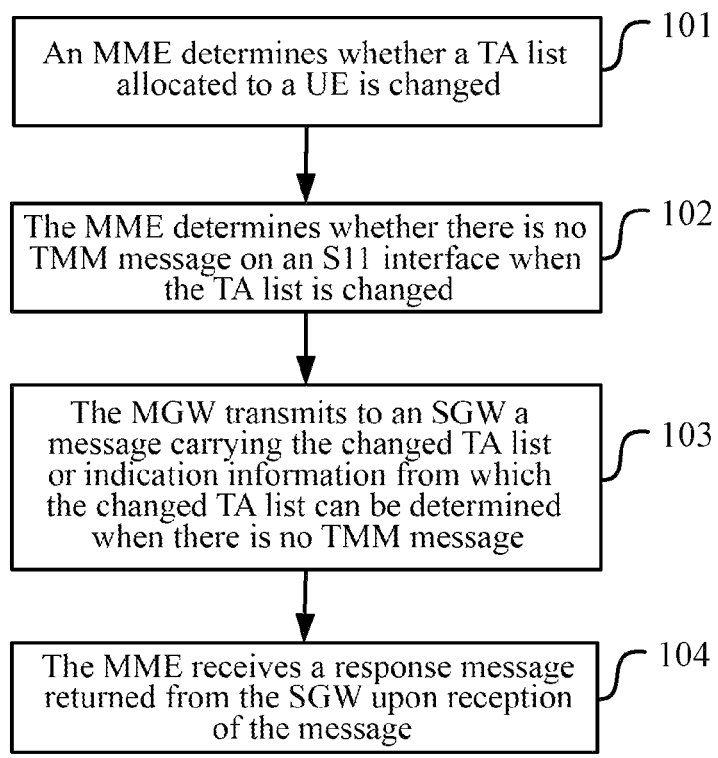
FIG. 1 is a schematic flow chart of performing a method for updating a TAI list in an embodiment of the invention.

FIG. 1 is a schematic flow chart of performing a method for updating a TAI list, and as illustrated in FIG. 1, a TAI list can be updated in the following steps:

Step 101. An MME determines whether a TAI list allocated to a UE is changed;

Step 102. The MME determines whether there is no TMM message on an S11 interface when the TAI list is changed; and Step 103. The MME transmits to an SGW a message carrying the changed TAI list or indication information from which the changed TAI list can be determined when there is no TMM message.

For example, respective possible TAI lists and indexes corresponding to the respective TAI lists are preconfigured at the MME and the SGW, and the indication information from which the changed TAI list can be determined is the index of the changed TAI list, and after the MME transmits the index of the changed TAI list to the SGW, the SGW can store the index locally, and subsequently the SGW transports the index back to the MME, and the MME itself retrieves the corresponding TAI list from a local database.

Of course, the indication information from which the changed TAI list can be determined will not be limited to the index of the changed TAI TEM list, and any other information from which the changed TAI list can be determined shall fall into the claimed scope of the invention, for example, information of an address at which the changed TAI list is stored, a name of the TAI list, etc.

In an implementation, the method can further include:

Step 104. The MME receives a response message returned from the SGW upon reception of the message.

In an implementation of the step 103, the message carrying the TAI list or the indication information may be a Modify Bearer Request message or a newly added message.

The two schemes will be described below respectively by way of an example.

I. A Modify Bearer Request message is reused for carrying.

When there is no signaling message on the S11 interface, a Modify Bearer Request message can be reused to transport the changed TAI list, particularly as follows:

1. When the TAI list allocated by the MME to the UE is changed, the MME decides to update the TAI list to the SGW.

2. If there is no TMM message on the S11 interface, then the new TAI list or the indication information from which the changed TAI list can be determined can be transported in a Modify Bearer Request message, and in a specific implementation, this will also require Information Elements (IEs) to be added to the Modify Bearer Request message as will be described below.

3. The SGW receives the Modify Bearer Request message carrying the TAI list or the indication information from which the changed TAI list can be determined and then records the TAI list or the indication information and returns a Modify Bearer Response message.

In a specific implementation, IEs can be added to the Modify Bearer Request message as follows:

| Information elements | P | Condition/Comment | IE Type | Instance |
| --- | --- | --- | --- | --- |
| ME Identity (MEI) | C | This IE shall be sent on the S5/S8 interfaces for the Gn/Gp SGSN to MME TAU. | MEI | 0 |
| User Location Information (ULI) | C | The MME/SGSN shall include this IE for TAU/RAU/Handover procedures if the PGW has requested location information change reporting and MME/SGSN support location information change reporting. An MME/SGSN which supports location information change shall include this IE for UE-initiated Service Request procedure if the PGW has requested location information change reporting and the UE's location info has changed. | ULI | 0 |

-continued

| Information elements | P | Condition/Comment | IE Type | Instance |
|---|---|---|---|---|
| | | The SGW shall include this IE on S5/S8 if it receives the ULI from MME/SGSN. | | |
| | C O | This IE shall also be included on the S4/S11 interface for a TAU/RAU/Handover with MME/SGSN change without SGW change procedure, if the level of support changes the MME shall include the ECGI/TAI in the ULI, the SGSN shall include the CGI/SAI in the ULI. The SGW shall include this IE on S5/S8 if it receives the ULI from MME/SGSN. | | |
| Serving Network | C | This IE shall be sent on S5/S8 for a TAU with an associated MME change and the SGW change. | Serving Network | 0 |
| | C O | This IE shall be included on S5/S8 for a RAU/Handover with an associated SGSN/MME change and SGW change. | | |
| RAT Type | C | This IE shall be sent on the S11 interface for a TAU with an SGSN interaction, UE triggered Service Request or an I-RAT Handover. This IE shall be sent on the S5/S8 interface for a change of RAT type. This IE shall be sent on the S4 interface for an RAU with MME interaction, a RAU with an SGSN change, a UE Initiated Service Request or an I-RAT Handover. | RAT Type | 0 |
| Indication Flags | C | This IE shall be included if any one of the applicable flags is set to 1. Applicable flags are: ISRAI: This flag shall be used on S4/S11 interface and set to 1 if the ISR is established between the MME and the S4 SGSN. Handover Indication: This flag shall be set for an E-UTRAN Initial Attach or for a UE Requested PDN Connectivity, if the UE comes from a non-3GPP access. Direct Tunnel Flag: This flag shall be used on the S4 interface and set to 1 if Direct Tunnel is used. Change Reporting support Indication: shall be used on S4/S11, S5/S8 and set if the SGSN/MME supports location Info Change Reporting. This flag should be ignored by SGW if no message is sent on S5/S8. Change F-TEID support Indication: This flag shall be used on S4/S11 for an IDLE state UE initiated TAU/RAU procedure and set to 1 to allow the SGW changing the GTP-U F-TEID. Re-initiate indication: This flag shall be included on S11 and S5/S8 interface to tell PGW to re-initiate the dedicated bearer activation/modification/deactivation procedure which was rejected by the MME because a handover procedure was in progress at the same time. | Indication | 0 |
| Sender F-TEID for Control Plane | C | This IE shall be sent on the S11 and S4 interfaces for a TAU/RAU/ Handover with MME/SGSN change and without any SGW change. This IE shall be sent on the S5 and S8 interfaces for a TAU/RAU/Handover with a SGW change. | F-TEID | 0 |
| Aggregate Maximum Bit Rate (APN-AMBR) | C | The APN-AMBR shall be sent for the PS mobility from the Gn/Gp SGSN to the S4 SGSN/MME procedures. | AMBR | 0 |
| Delay Downlink Packet Notification Request | | This IE shall be sent on the S11 interface for a UE triggered Service Request. | Delay Value | 0 |
| Bearer Contexts to be modified | C | This IE shall not be sent on the S5/S8 interface for a UE triggered Service Request. When Handover Indication flag is set to 1 (i.e., for EUTRAN Initial Attach or UE Requested PDN Connectivity when the UE comes from non-3GPP access), the PGW shall ignore this IE. See NOTE 1. Several IEs with the same type and instance value may be included as necessary to represent a list of Bearers to be modified. | Bearer Context | 0 |

-continued

| Information elements | P | Condition/Comment | IE Type | Instance |
|---|---|---|---|---|
| | | During a TAU/RAU/Handover procedure with an SGW change, the SGW includes all bearers it received from the MME/SGSN (Bearer Contexts to be created, or Bearer Contexts to be modified and also Bearer Contexts to be removed) into the list of 'Bearer Contexts to be modified' IEs, which are then sent on the S5/S8 interface to the PGW (see NOTE 2). | | |
| Bearer Contexts to be removed | C | This IE shall be included on the S4 and S11 interfaces for the TAU/RAU/Handover and Service Request procedures where any of the bearers existing before the TAU/RAU/Handover procedure and Service Request procedures will be deactivated as consequence of the TAU/RAU/Handover procedure and Service Request procedures. (NOTE 3) For each of those bearers, an IE with the same type and instance value, shall be included. | Bearer Context | 1 |
| Recovery | C | This IE shall be included if contacting the peer for the first time | Recovery | 0 |
| UE Time Zone | O | This IE may be included by the MME on the S11 interface or by the SGSN on the S4 interface. | UE Time Zone | 0 |
| | C | If SGW receives this IE, SGW shall forward it to PGW across S5/S8 interface. | | |
| MME-FQ-CSID | C | This IE shall be included by MME on S11 and shall be forwarded by SGW on S5/S8 according to the requirements in 3GPP TS 23.007 [17]. | FQ-CSID | 0 |
| SGW-FQ-CSID | C | This IE shall be included by SGW on S5/S8 according to the requirements in 3GPP TS 23.007 [17]. | FQ-CSID | 1 |
| User CSG Information (UCI) | C O | The MME/SGSN shall include this IE for TAU/RAU/Handover procedures and UE-initiated Service Request procedure if the PGW has requested CSG Info reporting and the MME/SGSN support the CSG information reporting. The SGW shall include this IE on S5/S8 if it receives the User CSG Information from MME/SGSN. | UCI | 0 |
| Last TAI List Container | C O | The MME shall include this IE on S11 interface when the TA List of UE is changed. | F-Container | 0 |
| Private Extension | O | | Private Extension | VS |

NOTE1:
This requirement is introduced for backwards compatibility reasons. If Bearer Contexts to be modified IE(s) is received in the Modify Bearer Request message, the PGW shall include corresponding Bearer Contexts modified IE(s) in the Modify Bearer Response message.
NOTE2:
According to the description in 3GPP TS 23.401 [3] e.g. subclause 5.3.3.1 "Tracking Area Update procedure with Serving GW change" and 3GPP TS 23.060 [35], during a TAU/RAU/Handover procedure with an SGW change, if the SGW receives 'Bearer Context to be removed' IEs, the SGW shall allocate the S5/8-U SGW F-TEID for those bearers and include also these bearers in the 'Bearer contexts to be modified' IE, which is then sent within this message on the S5/S8 interface to the PGW.
NOTE3:
The 'Bearer Contexts to be removed' IE signals to the SGW that these bearers will be removed by the MME/SGSN later on by separate procedures (e.g. MME/S4-SGSN initiated Dedicated Bearer Deactivation procedure). Therefore, the SGW will not delete these bearers during the ongoing TAU/RAU/Handover procedure (without an SGW change), a Handover procedure (with an SGW change except for an X2-Handover) and a Service Request procedure.

Particularly CO stands for Conditional-Optional.

A defined TAI list is added in the F-Container.

| | | | | Bits | | | | |
|---|---|---|---|---|---|---|---|---|
| Octets | 8 | 7 | 6 | 5 | 4 | 3 | 2 | 1 |
| 1 | Type = 118 (decimal) | | | | | | | |
| 2 to 3 | Length = n | | | | | | | |
| 4 | Spare | | | | Instance | | | |
| 5 | Spare | | | | Container Type | | | |
| 6 to (n + 4) | F-Container field | | | | | | | |

When the value of the Container Type is 4, it indicates that what is in the F-Container is the TAI list or the indication information from which the changed TAI list can be determined.

As can be apparent, the changed TAI list or the indication information from which the changed TAI list can be determined can be carried in the F-Container of the message in an implementation.

II. A newly added message is used for carrying.

When there is no signaling message on the S11 interface, a new message can alternatively be defined to transport the changed TAI list, particularly as follows:

1. When the TA list allocated by the MME to the UE is changed, the MME decides to update the TAI list to the SGW.

2. If there is no TMM message on the S11 interface to carry information of the new TAI list, then the new TAI list or the indication information from which the changed TAI list can be determined can be transported in a new message.

3. The SGW receives the new message carrying the TAI list or the indication information from which the changed TAI list can be determined and then records the TAI list or the indication information and returns a newly defined Response message.

In an implementation, new TAI List Notification Request and Response messages can be defined as follows:

Information elements included in the TAI List Notification Request message are as depicted in Table below:

| Information elements | P | Condition/Comment | IE Type | Ins. |
|---|---|---|---|---|
| Last TAI List Container | CO | The MME shall include this IE on S11 interface when the TA List of UE is changed. | F-Container | 0 |
| Private Extension | O | Vendor or operator specific information | Private Extension | VS |

Particularly the VS stands for Vendor or operator Specific.

Information elements included in the TAI List Notification Response message are as depicted in Table below:

| Information elements | P | Condition/Comment | IE Type | Ins. |
|---|---|---|---|---|
| Cause | M | | Cause | 0 |
| Private Extension | O | Vendor or operator specific information | Private Extension | VS |

Reference can be made to the description of the preceding embodiment for the definition of the F-Container in this embodiment.

In an implementation, the Cause and Private Extension IEs can be defined as in the 3GPP TS29.274.

Based upon the same inventive idea, there is further provided in an embodiment of the invention an MME apparatus, and since the apparatus addresses the problem under a similar principle to the method for updating a TAI list, reference can be made to the implementation of the method for an implementation of the apparatus, a repeated description of which will be omitted here.

Figure 2:
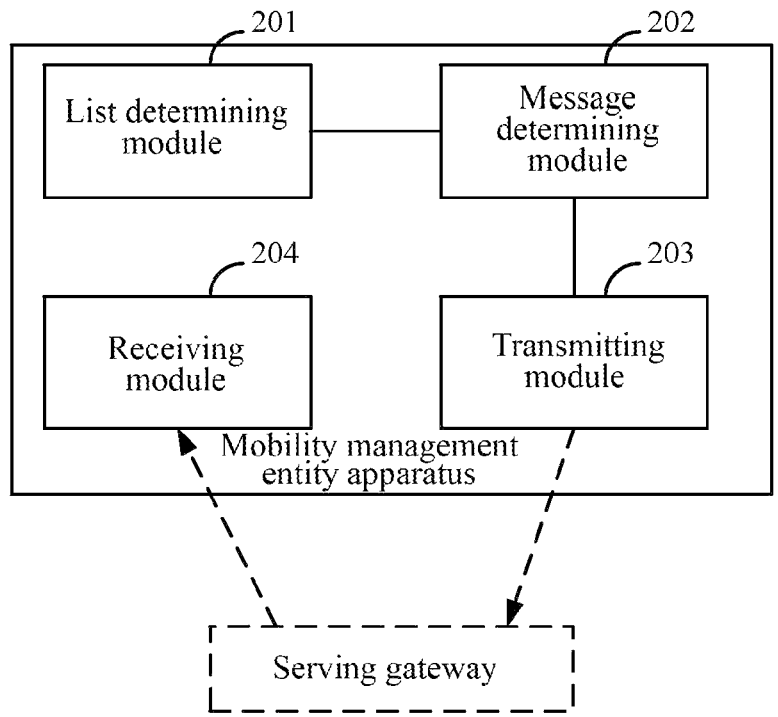
FIG. 2 is a schematic structural diagram of an MME apparatus in an embodiment of the invention.

FIG. 2 is a schematic structural diagram of an MME apparatus, and as illustrated, the MME can include:

A list determining module 201 configured to determine whether a TAI list allocated to a UE is changed;

A message determining module 202 configured to determine whether there is no TMM message on an S11 interface when the TAI list is changed; and A transmitting module 203 configured for the MME to transmit to an SGW a message carrying the latest TAI list or an indication from which the latest TAI list can be derived when there is no TMM message.

In an implementation, the transmitting module can further be configured to carry the latest TAI list or indication information, from which the changed TAI list can be determined, in a Modify Bearer Request message or a newly added message.

In an implementation, the transmitting module can further be configured to carry the latest TAI list or the indication information, from which the changed TAI list can be determined, in an F-Container of the message.

In an implementation, the transmitting module can further be configured to define Cause and Private Extension IEs in the F-Container as in the 3GPP TS29.274.

In an implementation, the MME can further include:

A receiving module 204 configured to receive a response message returned from the SGW upon reception of the message.

Figure 3:
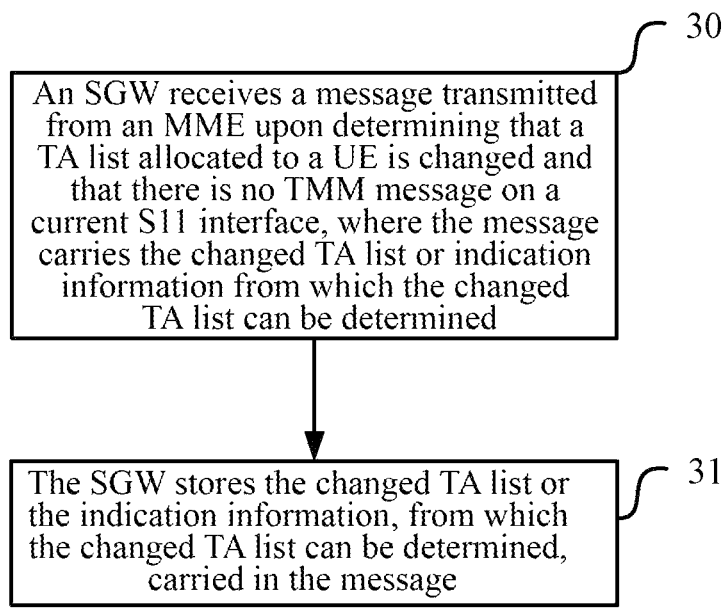
FIG. 3 is a schematic flow chart of performing another method for updating a TAI list in an embodiment of the invention.

Referring to FIG. 3, there is further provided in an embodiment of the invention a method for updating a TAI list, which includes the following steps:

Step 30: An SGW receives a message transmitted from an MME upon the MME determining that a TAI list allocated to a UE is changed and that there is no TMM message on a current S11 interface, where the message carries the changed TAI list or indication information from which the changed TAI list can be determined; and Step 31: The SGW stores the changed TAI list or the indication information, from which the changed TAI list can be determined, carried in the message.

Furthermore after the SGW stores the changed TAI list or the indication information, from which the changed TAI list can be determined, carried in the message, when the SGW knows in an echo mechanism or the like that the MME is restarted, the SGW triggers paging and also transmits to the MME a downlink data notification message carrying the stored TAI list or the stored indication information. The MME pages all the UEs, and the UEs are reattached to a network and reestablish all the PDN connections upon reception of a paging message carrying an IMSI.

Figure 4:
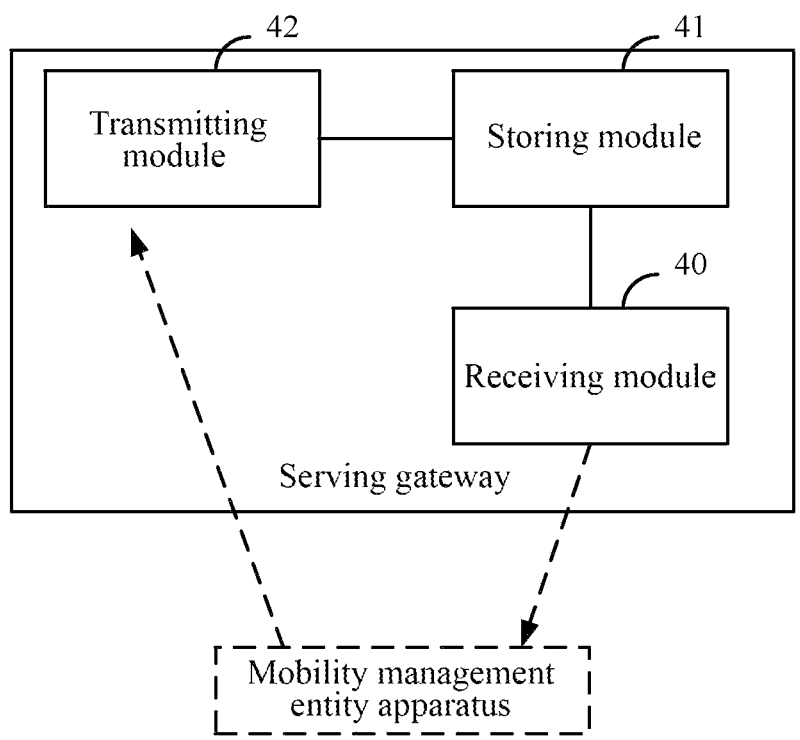
FIG. 4 is a schematic structural diagram of an SGW apparatus in an embodiment of the invention.

Referring to FIG. 4, an embodiment of the invention further provides an SGW apparatus including:

A receiving module 40 configured to receive a message transmitted from an MME upon determining that a TAI list allocated to a UE is changed and that there is no TMM message on a current S11 interface, where the message carries the changed TAI list or indication information from which the changed TAI list can be determined; and A storing module 41 configured to store the changed TAI list or the indication information, from which the changed TAI list can be determined, carried in the message.

Furthermore the apparatus further includes:

A transmitting module 42 configured to transmit to the MME a downlink data notification message carrying the stored TAI list or the stored indication information upon knowledge of that the MME is restarted after the changed TAI list or the indication information, from which the changed TAI list can be determined, carried in the message is stored.

For the convenience of a description, the respective components of the foregoing apparatuses have been described respectively by functionally dividing them into respective modules or units. Of course the functions of the respective modules or units can be performed in the same one or a plurality of items of software or hardware to put the invention into practice.

As can be apparent from the foregoing implementations, the technical solutions of the invention can enable an MME to transmit a TAI list of a UE to an SGW only when the TAI list is changed and to transmit the new TAI list to the SGW even if there is no TMM signaling message on an S11 interface at that time to thereby remedy the drawbacks of the solution in the prior art.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for updating a Tracking Area identity, TAI, list, comprising the steps of:
   determining, by a Mobility Management Entity, MME, whether a TAI list allocated to a User Equipment, UE, is changed;
   determining whether there is no Tunnel Management Message, TMM, sent on the interface between the MME and SGW when the TAI list is changed; and
   transmitting to a Serving Gateway, SGW, a message carrying the changed TAI list or indication information from which the changed TAI list can be determined when there is no TMM message sent on the interface between the MME and SGW.

2. The method according to claim 1, wherein the message is a Modify Bearer Request message or a newly added message.

3. The method according to claim 1, wherein the changed TAI list or the indication information from which the changed TAI list can be determined is carried in, a transparent container in the GTP-C message.

4. The method according to claim 1, further comprising:
   receiving, by the MME, a response message returned from the SGW upon reception of the message.

5. An MME apparatus, comprising:
   a list determining module configured to determine whether a TAI list allocated to a UE is changed;
   a message determining module configured to determine whether there is no Tunnel Management Message, TMM, message sent on the interface between the MME and SGW when the TAI list is changed; and
   a transmitting module configured to transmit to an SGW a message carrying the changed TAI list or indication information from which the changed TAI list can be determined when there is no TMM message sent on the interface between the MME and SGW.

6. The apparatus according to claim 5, wherein the transmitting module is further configured to carry a latest TAI list or the indication information, from which the changed TAI list can be determined, in a Modify Bearer Request message or a newly added message.

7. The apparatus according to claim 5, wherein the transmitting module is further configured to carry a latest TAI list or the indication information, from which the changed TAI list can be determined, in a transparent container in the GTP-C message.

8. The apparatus according to claim 5, further comprising:
   a receiving module configured to receive a response message returned from the SGW upon reception of the message.

9. A method for updating a Tracking Area identity, TAI, list, comprising the steps of:
   receiving, by an SGW, a message transmitted from an MME upon the MME determining that a TAI list allocated to a UE is changed and that there is no TMM message sent on the interface between the MWE and SGW, wherein the message carries the changed TAI list or indication information from which the changed TAI list can be determined; and
   storing, by the SGW, the changed TAI list or the indication information, from which the changed TAI list can be determined, carried in the message.

10. The method according to claim 9, after the SGW stores the changed TAI list or the indication information, from which the changed TAI list can be determined, carried in the message, the method further comprises:
    transmitting, by the SGW, to the MME a downlink data notification message carrying the stored TAI list or the stored indication information upon knowledge of that the MME is restarted.

* * * * *